United States Patent

Mogamiya

Patent Number: 5,305,038
Date of Patent: Apr. 19, 1994

[54] ZOOM LENS CAMERA

[75] Inventor: Makoto Mogamiya, Tokyo, Japan

[73] Assignee: Asahi Kogaku Kogyo Kabushiki Kaisha, Tokyo, Japan

[21] Appl. No.: 921,125

[22] Filed: Jul. 29, 1992

[30] Foreign Application Priority Data

Jul. 30, 1991 [JP] Japan .................................. 3-214777
Jul. 30, 1991 [JP] Japan .................................. 3-214778

[51] Int. Cl.$^5$ ........................ G03B 1/18; G03B 13/18; H02P 1/00
[52] U.S. Cl. ............................... 354/195.12; 354/400; 318/257
[58] Field of Search ............................ 354/195.12, 400; 318/280, 287, 257, 255, 256

[56] References Cited

U.S. PATENT DOCUMENTS

| | | | |
|---|---|---|---|
| 3,594,625 | 7/1971 | Richardson | 318/257 |
| 4,206,982 | 6/1980 | Osanai | 352/140 |
| 4,445,757 | 5/1984 | Enomoto et al. | 354/195.12 |
| 4,952,962 | 8/1990 | Suzuki et al. | 354/400 |
| 4,962,399 | 10/1990 | Numako et al. | 354/195.1 |
| 5,019,765 | 5/1991 | Ogasawara | 354/195.12 X |
| 5,136,320 | 8/1992 | Kobayashi et al. | 354/195.1 X |
| 5,148,199 | 9/1992 | Kohomoto et al. | 354/195.1 |
| 5,148,201 | 9/1992 | Umetsu et al. | 354/195.1 |
| 5,198,847 | 3/1993 | Takahashi | 354/195.12 |

FOREIGN PATENT DOCUMENTS

| | | |
|---|---|---|
| 1549729 | 8/1979 | United Kingdom . |
| 2234079 | 1/1991 | United Kingdom . |
| 2240854 | 8/1991 | United Kingdom . |
| 2241586 | 9/1991 | United Kingdom . |

OTHER PUBLICATIONS

United Kingdom Search Report, Short, Oct. 5, 1992.

Primary Examiner—Michael L. Gellner
Assistant Examiner—Jae N. Noh
Attorney, Agent, or Firm—Sandler, Greenblum & Bernstein

[57] ABSTRACT

A zoom lens camera including a zoom taking lens having a zooming function, a motor for driving the zoom taking lens, a telephoto switch which is actuated to effect the motor to drive the zoom taking lens in a manner that increases the focal length thereof, a wide angle switch which is actuated to effect the motor to drive the zoom taking lens in a manner that decreases the focal length thereof, and a zooming speed controller for varying the zooming speed of the zoom taking lens when a predetermined condition is satisfied during the zooming operation when one of the telephoto switch or wide angle switch is actuated.

13 Claims, 7 Drawing Sheets

ZOOM LENS CAMERA

BACKGROUND OF THE INVENTION

1. Field of the Invention

The present invention relates to a motor driven zoom lens camera. More precisely, it relates to a zooming speed control apparatus thereof.

2. Description of Related Art

A known motor driven zoom lens camera has zoom switches including a telephoto switch for increasing the focal length and a wide angle switch for decreasing the focal length. When one of the zoom switches is actuated (turned ON), a drive motor is rotated in the forward or reverse directions to effect a zooming operation in the telephoto direction or the wide angle direction, respectively. In a conventional zoom lens camera, the zooming speed in the telephoto or wide angle directions is constant.

In a recent zoom lens camera, when a main switch is turned ON or OFF, a zoom taking lens is moved between a photographing position in which a picture can be taken and a retracted position in which the zoom taking lens is retracted, respectively. It is known to provide a zoom lens which is operable, in accordance with the operation of the main switch, at a speed higher than the speed at which the lens is driven in a normal zooming operation. However, even in a known zoom lens camera in which a higher speed of the zoom taking lens is effected when the main switch is turned ON or OFF, accelerated movement is not available during the normal zooming operation.

SUMMARY OF THE INVENTION

The primary object of the present invention is to provide a zoom lens camera in which various zooming speeds can be obtained without increasing the number of zoom switches.

Different zooming speeds are useful, for example, when a photographer wishes to quickly move the zoom taking lens from the telephoto position to the wide angle position and vice versa.

According to an aspect of the present invention, there is provided a zoom lens camera including a zoom taking lens having a zooming function, a drive means for driving the zoom taking lens, a telephoto switch which is actuated to move the zoom taking lens so as to increase the focal length thereof through the drive means, a wide angle switch which is actuated to move the zoom taking lens so as to decrease the focal length thereof through the motor drive means, and a zooming speed varying means for varying the zooming speed of the zoom taking lens through the drive means when a predetermined condition is satisfied during the zooming operation in which one of the telephoto switch or the wide angle switch is actuated.

Namely, in a zoom lens camera in which there are only two zooming operation switches, including the telephoto switch and the wide angle switch, according to the present invention, a speed varying means is provided for varying the zooming speed of the zoom taking lens when a predetermined condition is satisfied during the zooming operation in which one of the telephoto switch or the wide angle switch is actuated.

There are, for example, two zooming speeds selected by the speed varying means. The taking lens which is moved at a first zooming speed (standard speed) in the normal zooming operation is moved at a second zooming speed, different from the first zooming speed, when the predetermined condition is satisfied. The second zooming speed can be either higher or lower than the first zooming speed. Preferably, the second zooming speed is higher than the first zooming speed.

In a first embodiment, the predetermined condition is defined by the actuation of the telephoto switch or the wide angle switch during the operation of the wide angle switch or the telephoto switch, respectively. Namely, for example, when the telephoto switch or the wide angle switch is actuated while the wide angle switch or the telephoto switch is being operated (i.e. continuously depressed), respectively, the zooming speed of the taking lens is changed from the first speed to the second speed without changing the zooming direction.

In a second embodiment, the predetermined condition is defined by the continuous operation time of the telephoto switch or the wide angle switch being greater than a predetermined period of time. Namely, the zooming operation is effected at a relatively low speed at the beginning stage of the zooming operation, immediately after the telephoto switch or the wide angle switch is actuated, and is then increased to a second speed if the switch is continuously operated beyond a predetermined period of time.

The continuous operation time of the telephoto switch or the wide angle switch exceeding a predetermined value can be directly detected or indirectly detected by detecting the time in which no change in the zooming direction takes place.

According to another aspect of the present invention, there is provided a speed control apparatus of a reversible motor comprising a first switch for rotating the reversible motor in the forward direction, a second switch for rotating the reversible motor in the reverse direction, and a speed control means for varying the rotational speed of the reversible motor when the first or second switch is actuated during the rotation of the reversible motor in the forward or reverse direction at a first speed by the operation of the second or first switch, respectively, so that the reversible motor rotates at a second speed without a change in the direction of rotation.

The present disclosure relates to subject matter contained in Japanese patent application No. 03-214777 and No. 03-214778 (both filed on Jul. 30, 1991) which are expressly incorporated herein by reference in their entireties.

BRIEF DESCRIPTION OF THE DRAWINGS

The present invention will be described below in detail with reference to the accompanying drawings, in which.

DESCRIPTION OF THE PREFERRED EMBODIMENTS

FIGS. 1 through 4 show a first embodiment of the present invention, so that when a telephoto switch or a wide angle switch is actuated during the operation of the wide angle switch or telephoto switch, respectively, the zooming speed is increased without changing the zooming direction. For example, if the wide angle switch is actuated while the telephoto switch is being actuated, the zooming speed is increased to a predetermined value while maintaining the telephoto zooming direction.

Figure 2:
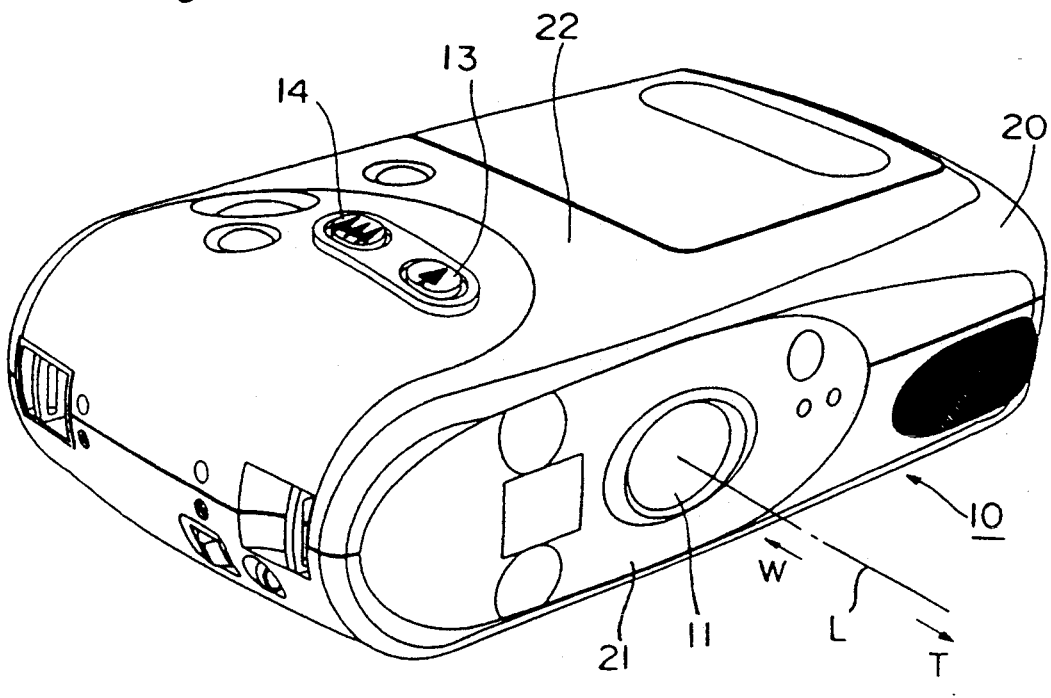
FIG. 2 is a perspective view of a zoom lens camera according to the present invention.
Figure 3:
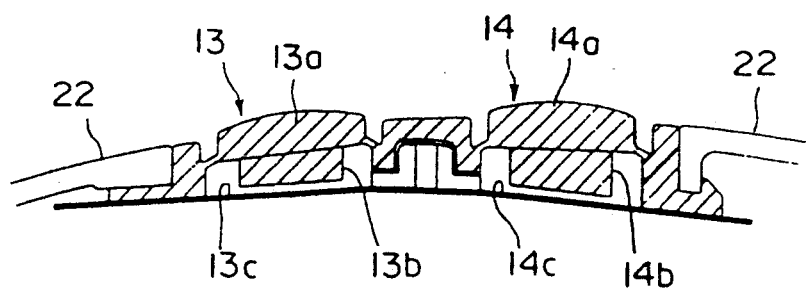
FIG. 3 is a longitudinal sectional view of a telephoto switch and a wide angle switch.

A zoom lens camera 10 includes a zoom taking lens 11 having a zooming function, a drive means 12 including a variable speed zoom motor, such as a DC motor, for moving the taking lens 11 in the direction of the optical axis L (FIG. 2), a telephoto switch 13 which is actuated to move the taking lens 11 towards the telephoto end T to increase the focal length, and a wide angle switch 14 which is actuated to move the taking lens 11 toward the wide angle side W to decrease the focal length (FIG. 2).

Figure 1:
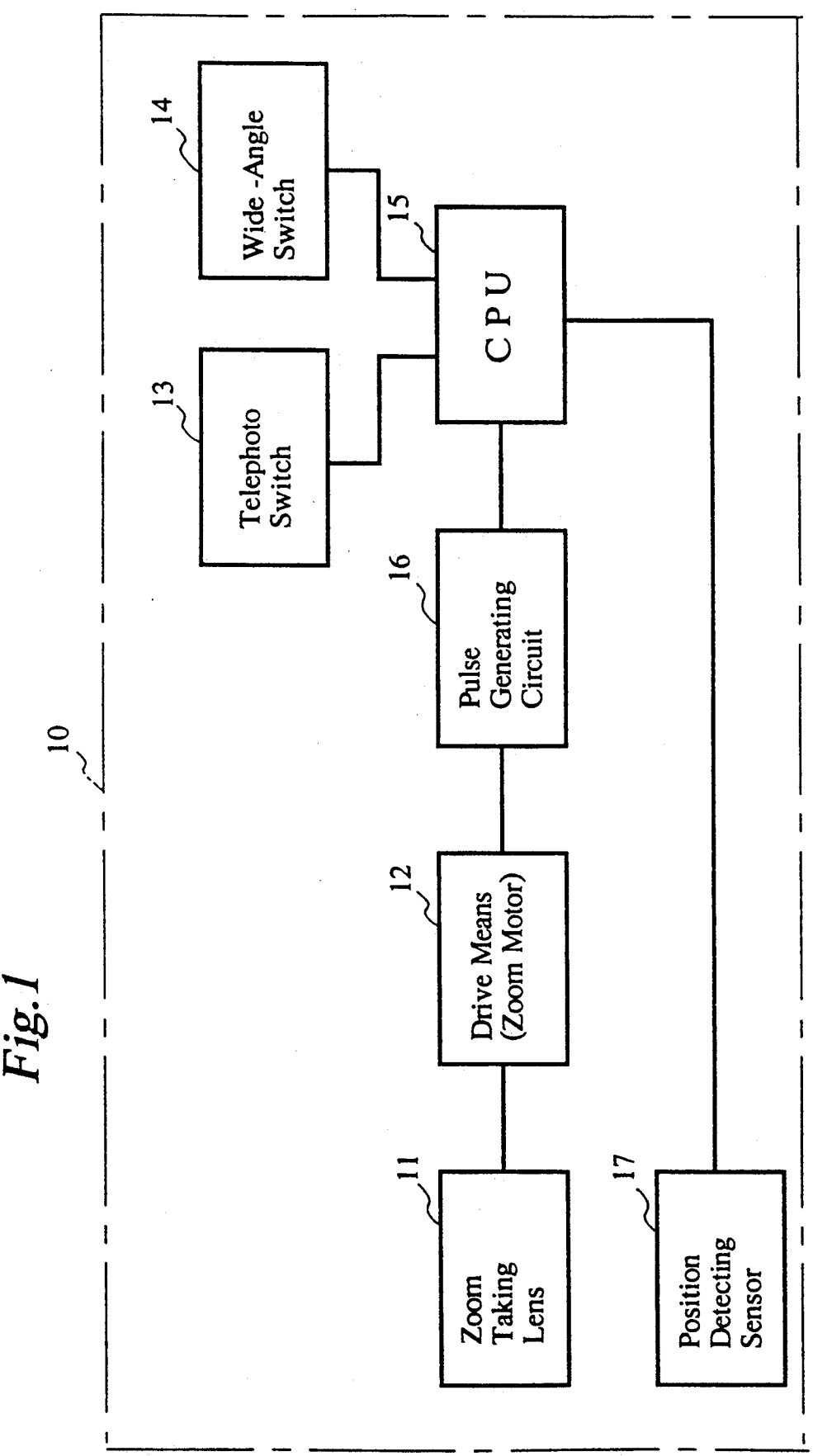
FIG. 1 is a block diagram of a zoom lens camera according to a first embodiment of the present invention.

As can be seen in FIG. 1, the zoom lens camera 10 also includes a central processing unit (CPU) 15 which determines the direction and speed of the movement of taking lens 11, in accordance with the operation of the telephoto switch 13 and the wide angle switch 14, to control the operation of drive means 12, through a pulse generating circuit 16 which generates pulse signals to define the speed of the zoom motor of the drive means 12 in accordance with the command signals of the CPU 15. The CPU 15 and the pulse generating circuit 16 constitute a control means for controlling the drive of the motor drive means 12.

CPU 15 controls the pulse generating circuit 16 in accordance with the direction and speed of the taking lens 11 determined thereby when the telephoto switch 13 or the wide angle switch 14 is actuated. Consequently, the pulse generating circuit 16 generates, wave-shape pulse signals corresponding to the determined direction and speed of the taking lens 11 to the zoom motor 12, so that the latter moves the taking lens 11 at the determined speed and in the determined direction in accordance with the pulse signals output from the pulse generating circuit 16 so as to vary the focal length.

FIG. 2 is an external view of a zoom lens camera 10 as constructed above. The zoom lens camera 10 has a housing 20 which is provided with a front surface 21 in which the taking lens 11 is exposed. The telephoto switch 13 and the wide angle switch 14 are provided on the top surface 22 of housing 20.

Telephoto switch 13 and wide angle switch 14 are comprised of push buttons 13a and 14a, electrically conductive rubber portions 13b and 14b which are provided on the back surfaces of the push buttons 13a and 14a, and flexible printed circuit (FPC) boards 13c and 14c which are opposed to the electrically conductive rubber portions 13b and 14b, respectively. When one of the push buttons 13a or 14a is depressed, electrical contacts (not shown) formed on the FPC boards 13c or 14c are short-circuited by the electrically conductive rubber portions 13b or 14b, so that the associated telephoto switch 13 or the wide angle switch 14 are turned ON.

CPU 15 detects whether or not the electrical contacts on the FPC boards 13c or 14c are short-circuited to judge whether or not the telephoto switch 13 or the wide angle switch 14 is being actuated. In accordance with the detection results, the direction and speed of the taking lens 11 are determined, so that the pulse signals corresponding to the direction and speed of the taking lens 11 are output from the pulse generator 16 to the zoom motor 12.

Figure 4:
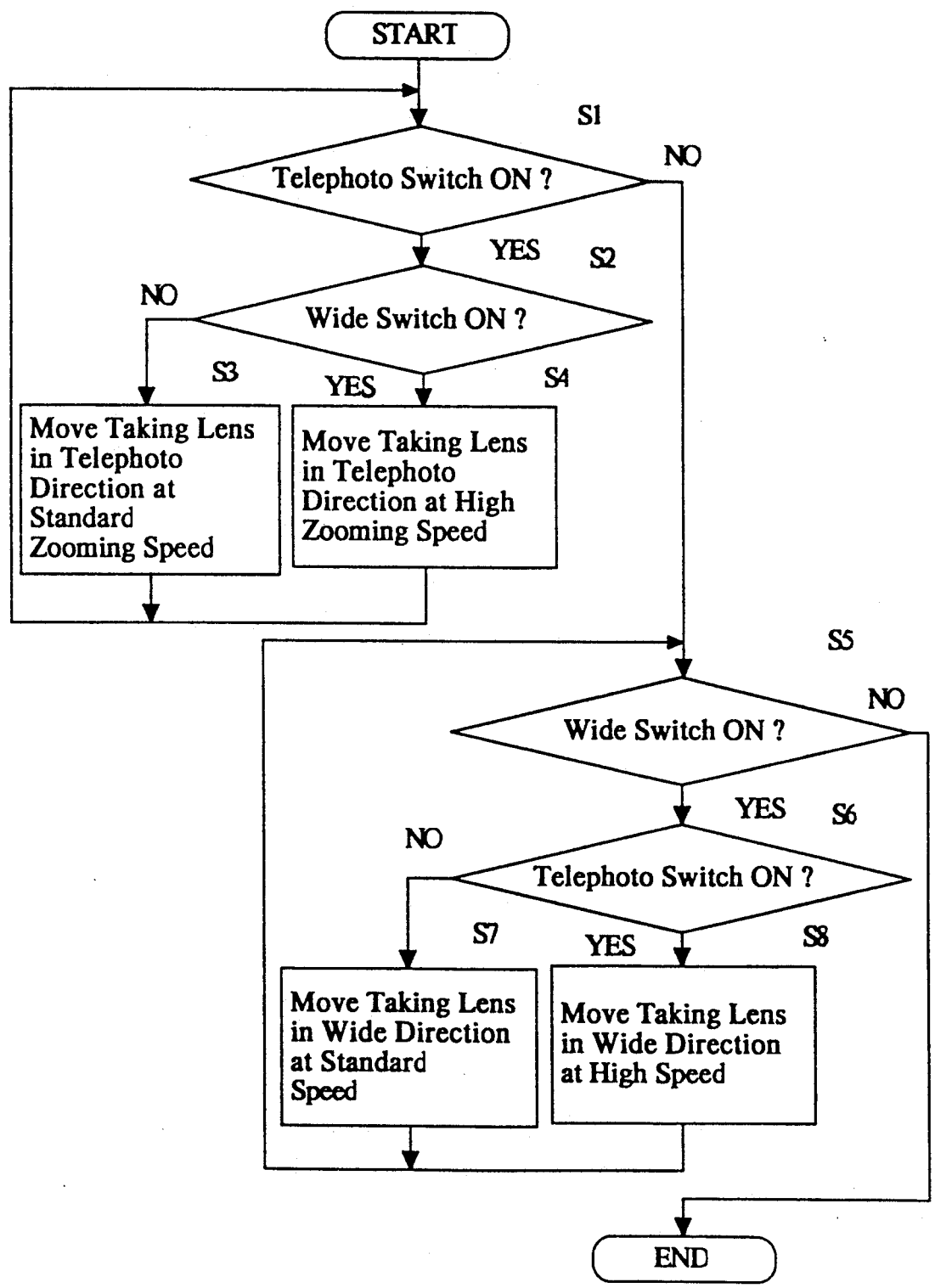
FIG. 4 is a flow chart of operations of a zoom lens camera shown in FIGS. 1 through 3.

The operation of the zoom lens camera 10 according to the present invention is as follows, with reference to FIG. 4. When the CPU 15 detects that the telephoto switch 13 or the wide angle switch 14 is actuated, movement of the zoom lens is started. At step S1, whether or not the telephoto switch 13 is turned ON is checked by the CPU 15. If the telephoto switch 13 is turned ON at step S1, whether or not the wide angle switch 14 is turned ON is checked at step S2. If wide angle switch 14 is not turned ON at step S2, control proceeds to step S3 where the pulse generator 16 and the drive means 12 are effected to move the taking lens 11 toward the telephoto end T at a predetermined normal speed (standard speed) to increase the focal length thereof. Thereafter, control is returned to step S1.

If the wide angle switch 14 is turned ON at step S2, the CPU 15 determines that the wide angle switch 14 is turned ON during the operation of the telephoto switch 13, control then proceeds to step S4. At step S4, the pulse generator 16 and the drive means 12 are effected to move the taking lens 11 toward the telephoto end at an increased speed, higher than the standard speed. Thereafter, control is returned to step S1.

Variation of the zooming speed can be realized by various means per se known. In the simplest example, the electrical power to be supplied to the variable speed motor is varied to change the speed thereof.

If the telephoto switch 13 is turned OFF at step S1, control proceeds to step S5, where it is checked whether or not the wide angle switch 14 is turned ON. If the wide angle switch 14 is turned ON at step S5, whether or not the telephoto switch 13 is turned ON is checked at step S6. If the telephoto switch 13 is turned OFF at step S6, control proceeds to step S7 where the pulse generator 16 and the drive means 12 are effected to move the taking lens 11 toward the wide angle end W at a predetermined normal speed (standard speed) to decrease the focal length thereof. Thereafter, control is returned to step S5.

If the telephoto switch 13 is turned ON at step S6, the CPU 15 determines that the telephoto switch 13 is turned ON during the operation of the wide angle switch 14, control then proceeds to step S8. At step S8, the pulse generator 16 and the drive means 12 are effected to move the taking lens 11 toward the wide angle end W at an increased speed, higher than the standard speed. Thereafter, control is returned to step S5.

If the telephoto switch 13 is turned OFF at step S1 and the wide angle switch 14 is turned OFF at step S5 after commencement of the operation or after control is returned from step S3 or S4, or if the wide angle switch 14 is turned OFF at step S5 after the control is returned from step S7 or S8, the sequence of operations is completed.

Namely, if only the telephoto switch 13 is actuated by an operator, the operations at steps S1 through S3 are performed to move the zoom taking lens 11 in the optical axis direction L toward the telephoto end T at the standard speed, and if the telephoto switch 13 is released, the movement of the zoom taking lens 11 toward the telephoto end T is stopped.

Similarly, if only the wide angle switch 14 is actuated by an operator, the operations at steps S1, and S5 through S7 are performed to move the zoom taking lens 11 in the optical axis direction L toward the wide angle end W at the standard speed, and if the wide angle switch 14 is released, the movement of the zoom taking lens 11 toward the wide angle end W is stopped.

The CPU 15 is connected to a position detecting sensor 17 which detects the position of the taking lens 11 within the zooming range. For example, when a control zoom mode, in which an object is maintained at a constant size within the field of view, is selected from among photographic modes of the zoom taking lens 11, the CPU 15 determines the direction and the displacement of the zoom taking lens 11 in accordance with the detection results of the position detecting sensor 17, so that the pulse generator 16 and the zoom motor 12 are controlled to move the zoom taking lens 11 in the optical axis direction L towards the telephoto end T or towards the wide angle end W.

As can be understood from the above discussion, according to the present invention, the speed of the zoom taking lens (zooming speed) in the optical axis direction can be easily varied only by depressing the telephoto switch 13 and the wide angle switch 14, without additionally providing a special switch, resulting in the realization of a simple and inexpensive zoom lens camera.

Although the speed of the taking lens 11, effected by the zoom motor (drive means) 12 is varied in accordance with the pulse signals issued from the pulse generator (pulse generating circuit) 16 in the illustrated embodiment, it is possible to use a stepping motor as the zoom motor to control the speed of the taking lens. In this alternative, the speed of the stepping motor is controlled by the CPU 15.

FIGS. 5 through 8 show a second embodiment of the present invention, in which the zooming speed is increased when the operation time of the telephoto switch or wide angle switch is above a predetermined value.

Figure 5:
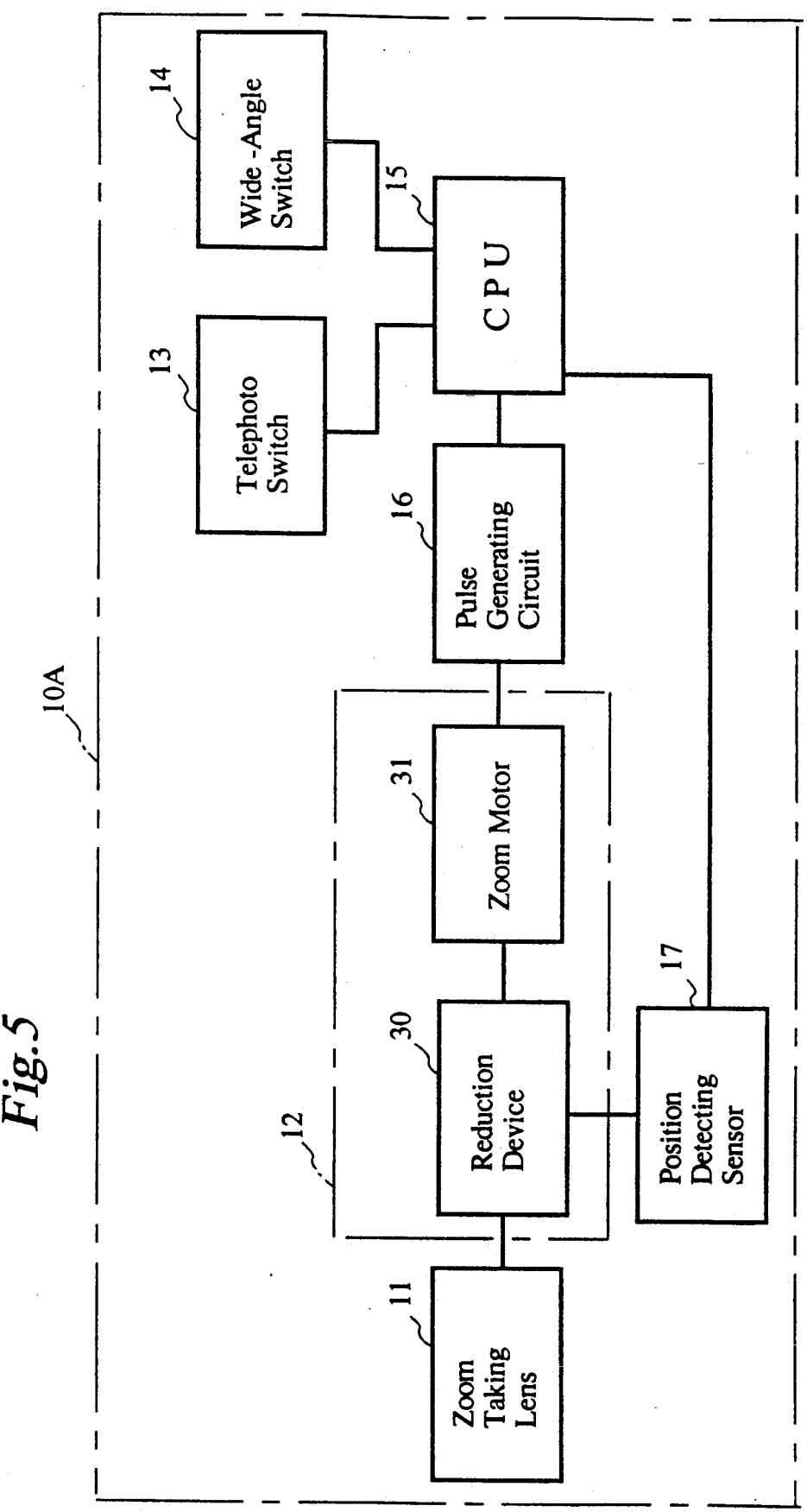
FIG. 5 is a block diagram of a zoom lens camera according to a second embodiment of the present invention.
Figure 6A:
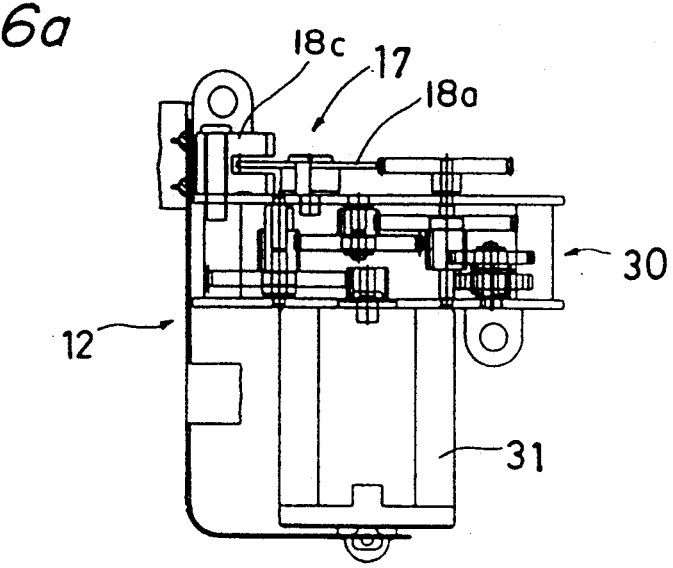
FIGS. 6a, 6b and 6c are a plan view, front elevation view, respectively, and side elevation view of a zoom drive unit of a zoom lens camera shown in FIG. 5, respectively.
Figure 6B:
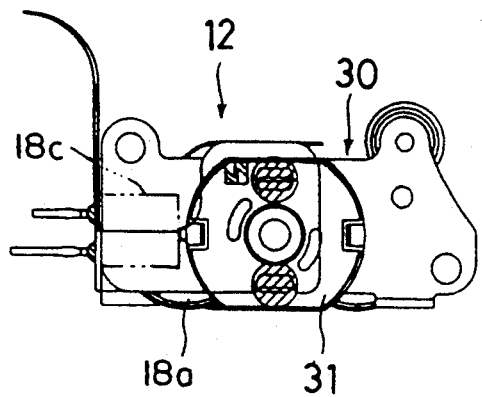
Figure 6C:
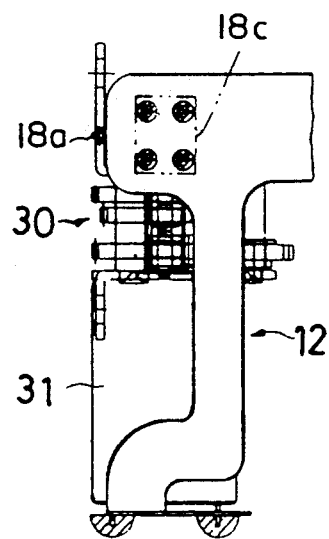
Figure 7:
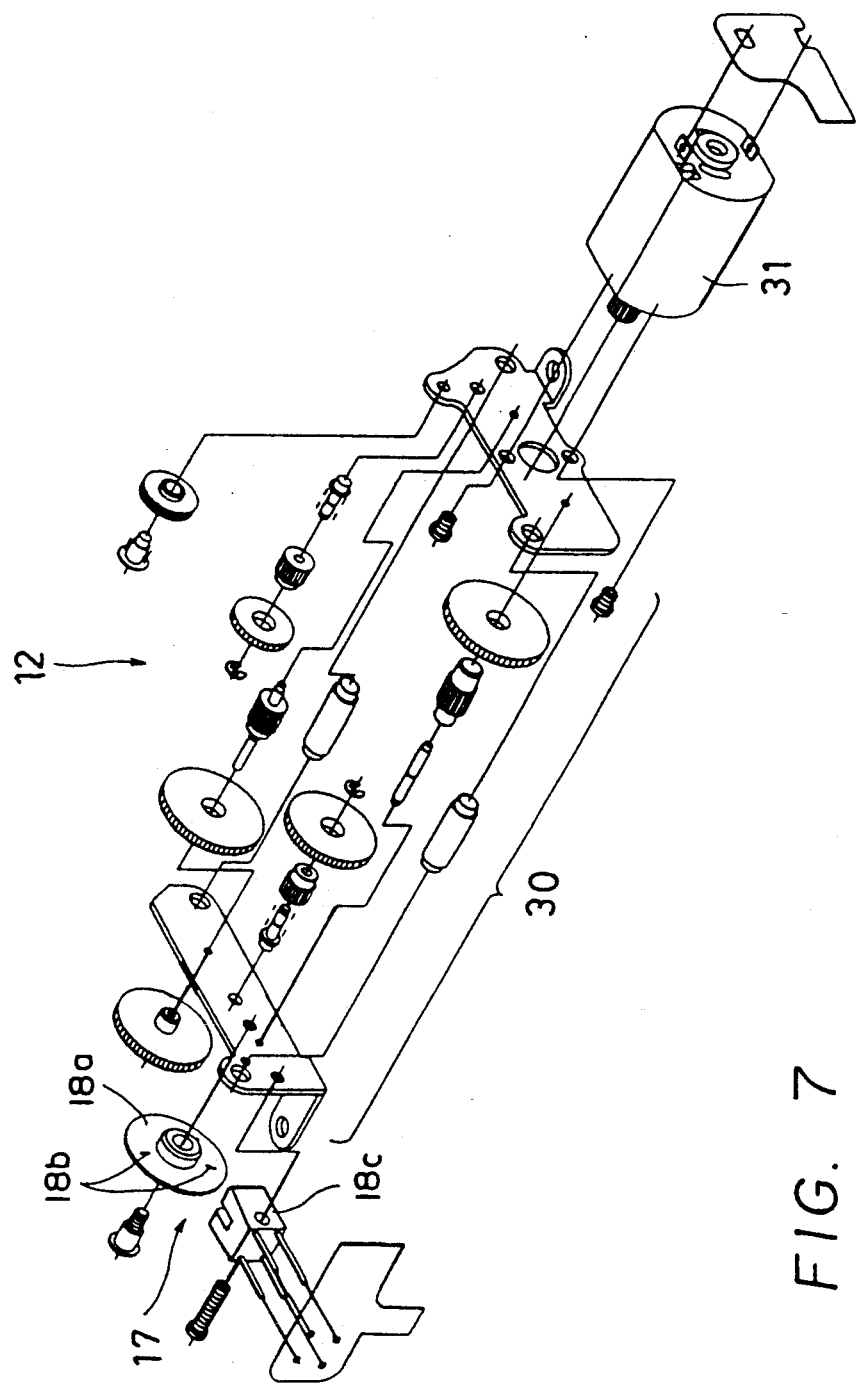
FIG. 7 is an exploded perspective view of a zoom drive unit shown in FIGS. 6a, 6b, and 6c; and, FIG. 8 is a flow chart of operations of a zoom lens camera shown in FIG. 5.

FIG. 5 shows a block diagram of a zoom lens camera 10A corresponding to FIG. 1, according to a second embodiment of the present invention. In comparison with the first embodiment shown in FIG. 1, the arrangement shown in FIG. 5 additionally includes a reduction device 30 located between the zoom motor 31 and the zoom taking lens 11 to detect time during which the telephoto switch 13 or the wide angle switch 14 is being continuously operated. The reduction device 30 outputs signals, indicating that the continuous operation time of the telephoto switch or the wide angle switch has exceeded a predetermined value, to the CPU 15 through the detecting sensor 17. Consequently, the CPU 15 varies the zooming speed of the taking lens 11 through the drive means 12, in accordance with the detection signals.

FIGS. 6a, 6b, 6c, and FIG. 7 illustrate a concrete example of the construction of drive means 12, including the zoom motor 31, the reduction device 30, and the position detecting sensor 17.

The position detecting sensor 17 is associated with the reduction device 30, and has a gear 18a which is provided with a plurality of slits 18b extending through the thickness of the gear 18a and spaced equidistant from one another. The position detecting sensor 17 also includes a generally U-shaped photocoupler 18c having a light emitter and a light receiver located on opposite sides of the gear 18a. The light emitter emits, for example, infrared light which is received by the light receiver, at least during the operation of the zoom motor 31.

The gear 18a is located so as to intercept the optical path of the photocoupler 18c, so that when the gear 18a is rotated in accordance with the operation of the zoom motor 12, light emitted from the light emitter is intermittently received by the light receiver through the slits 18b of the rotating gear 18a, so as to output pulse signals to the CPU 16, in accordance with the intermittently received light.

Namely, the position detecting sensor 18 outputs the number of pulses corresponding to the displacement of the zoom taking lens 11 in accordance with the rotation of the zoom motor 12, and accordingly, the axial movement of the zoom taking lens 11 in the optical axis direction L.

CPU 15 judges whether the telephoto switch 13 and the wide angle switch 14 are depressed, based on the detection of the short-circuit of the electrical contacts formed on the FPC boards 13c and 14c by the electrically conductive rubber members 13b and 14b. As a result, the CPU 15 determines the zooming direction of the taking lens 11 in accordance with the judgement of CPU 15. Thereafter, the CPU 15 determines the direction and speed of the zoom motor 31 and causes the pulse generator 16 to output the wave-shape pulse signals to move the taking lens 11 in the determined zooming direction at a predetermined standard speed. Thus, the taking lens 11 is moved in the zooming direction and at the zooming speed determined by the CPU 15 by the zoom motor 31 in accordance with the pulse signals input to the zoom motor 31 from the pulse generating circuit 16.

CPU 15 detects movement of the taking lens 11 in the optical axis direction, based on the pulse signals input to the CPU 15 from the position detecting sensor 17, and detects the current axial position of the taking lens in accordance with the data regarding the operation of the telephoto switch 13 or the wide angle switch 14 and the number of pulses input to the CPU 15 from the position detecting sensor 17.

The CPU 15 counts the number of pulses consecutively output from the position detecting sensor 17. When the number of pulses reaches a predetermined value (e.g., 8) stored in the CPU 15, the CPU 15 determines that the zoom taking lens 11 has continued to move in the same zooming direction for a predetermined time and, accordingly, varies the pulse shape output from the pulse generating circuit 16 to increase the speed at which the taking lens 11 is driven. Namely, in the illustrated embodiment, the continuous operation time of the telephoto switch 13 or the wide angle switch 14 is not directly, but rather indirectly detected by detecting the time for which the taking lens is driven in the same direction from the commencement of the zooming operation.

Figure 8:
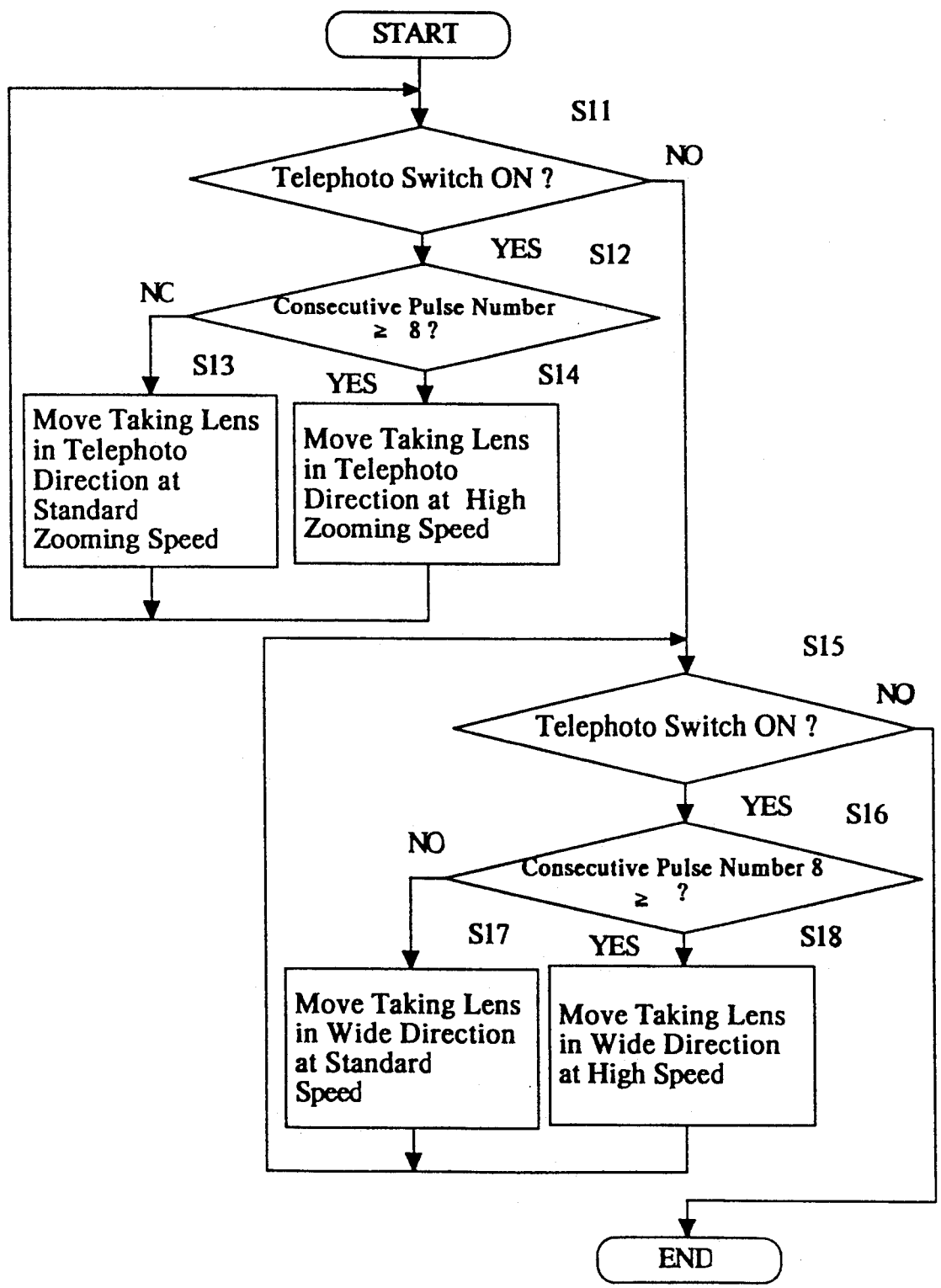

FIG. 8 is a flow chart of the operation of the zoom lens camera 10A according to the second embodiment.

When the CPU 15 detects that the telephoto switch 13 or the wide angle switch 14 is actuated, the operation starts. At step S11, whether or not the telephoto switch 13 is turned ON is checked by the CPU 15. If the telephoto switch 13 is turned ON at step S11, whether or not the number of consecutive pulses from the position detecting sensor 17 is greater than or equal to a predetermined value (e.g., 8) is checked at step S12. If the counted number is less than or equal to 7, control proceeds to step S13 where the pulse generator 16 and the zoom motor 31 are controlled to move the taking lens 11 toward the telephoto end T at a predetermined standard zooming speed. Thereafter, control is returned to step S11.

If the counted number is larger than 7 at step S12, control proceeds to step S14 where the pulse generator 16 and the zoom motor 31 are effected to move the taking lens 11 toward the telephoto end T at an increased zooming speed. Thereafter, control is returned to step S11.

The variation of the zooming speed can be realized by various means per se known. In the simplest example, the electrical power to be supplied to the variable speed motor is varied to change the speed thereof.

If the telephoto switch 13 is not turned ON at step S11, control proceeds to step S15 where it is checked whether or not wide angle switch 14 is turned ON. If the wide angle switch 14 is turned ON at step S15, whether or not the number of consecutive pulses of the position detecting sensor 17 is greater than or equal to a predetermined value (e.g., 8) is checked at step S16. If the counted number is equal to or less than 7, control proceeds to step S17 where the pulse generator 16 and the zoom motor 31 are effected to move the taking lens 11 toward the wide angle end W at a predetermined standard zooming speed. Thereafter, control is returned to step S15.

If the counted number is larger than 7 at step S16, control proceeds to step S18 where the pulse generator 16 and the zoom motor 31 are effected to move the taking lens 11 toward the wide angle end W at an increased zooming speed. Thereafter, control is returned to step S15.

If the telephoto switch 13 is turned OFF at step S11 and the wide angle switch 14 is turned OFF at step S15 after the commencement of the operation or after control is returned from step S13 or S14, or if the wide angle switch 14 is turned OFF at step S15 after control is returned from step S17 or S18, the sequence of operations is completed.

As can be understood from the above discussion, according to the present invention, the speed at which the zoom taking lens is driven (zooming speed) in the optical axis direction toward the telephoto end or the wide angle end can be easily switched by simply depressing the telephoto switch 13 or the wide angle switch 14 without additionally providing a special switch. In accordance with the above, a simple and inexpensive zoom lens camera may be realized.

Although the zooming speed is switched to the increased zooming speed from the standard zooming speed when the counted number of the consecutive pulses output from the position detecting sensor 17 becomes 8 in the illustrated embodiment, the number is not limited to 8 and may be optionally selected.

Alternatively, it is possible to directly measure the continuous operation time of the telephoto switch 13 or the wide angle switch 14, so that the zooming speed of the taking lens 11 is increased when the time measured reaches a predetermined value.

I claim:

1. A zoom lens camera comprising:
   a zoom taking lens having a zooming function;
   a drive means for driving the zoom taking lens;
   a telephoto switch which is actuated to effect the drive means to drive the zoom taking lens in a manner that increases the focal length thereof;
   a wide angle switch which is actuated to effect the drive means to drive the zoom taking lens in a manner that decrease the focal length thereof; and
   a zooming speed varying means for varying a zooming speed of the zoom taking lens through the drive means when a predetermined condition is satisfied during a zooming operation when one of the telephoto switch or the wide angle switch is being actuated, wherein the predetermined condition occurs when one of the wide angle switch or telephoto switch is actuated while the other of the telephoto or wide angle switch is being actuated, respectively.

2. A zoom lens camera according to claim 1, wherein the zooming speed is increased by the zooming speed varying means when the predetermined condition is satisfied.

3. A zoom lens camera according to claim 1, wherein said drive means comprises a variable speed motor.

4. A zoom lens camera according to claim 3, wherein said speed varying means varies the speed of the variable speed motor.

5. A speed control apparatus for a reversible motor, comprising:
   a first switch for rotating the reversible motor in a forward direction;
   a second switch for rotating the reversible motor in a reverse direction; and
   a speed control means for varying the rotational speed of the reversible motor when one of the first or second switch is actuated during the rotation of the reversible motor in the forward or reverse direction at a first speed by the operation of the second or first switch, respectively, so that the reversible motor rotates at a second speed without a change in the direction of rotation, wherein said second speed is different from said first speed.

6. A speed control apparatus according to claim 5, wherein the second speed is higher than the first speed.

7. A speed control apparatus according to claim 5, wherein the apparatus is used in a zoom lens camera, and wherein said reversible motor is a motor for driving a zoom taking lens of the zoom lens camera.

8. A speed control apparatus according to claim 7, wherein said first switch is a telephoto switch which is actuated to move the zoom taking lens to thereby increase the focal length thereof.

9. A speed control apparatus according to claim 7, wherein said second switch is a wide angle switch which is actuated to move the zoom taking lens to thereby decrease the focal length thereof.

10. A zoom lens camera comprising:
    a taking lens having a zooming function;
    a drive means for driving the taking lens in the optical axis direction thereof;
    a telephoto switch which is actuated to effect a drive means to drive the taking lens in the telephoto direction;

a wide angle switch which is actuated to effect a drive means to drive the taking lens in the wide angle direction; and, a means for controlling the drive means to drive the taking lens at a predetermined first speed in the telephoto direction or the wide angle direction in accordance with the operation of the telephoto switch or the wide angle switch, respectively;

wherein said control means controls the drive means to drive the taking lens at a predetermined second speed, higher than the predetermined first speed, in the telephoto direction and the wide angle direction when the wide angle switch is actuated during the operation of the telephoto switch and when the telephoto switch is actuated during the operation of the wide angle switch, respectively.

11. In a zoom lens camera comprising:
a taking lens having a zooming function;
a drive means for driving the taking lens in the optical axis direction thereof;
a switch means which is actuated to drive the taking lens in the optical axis direction;
a means for controlling the drive means to drive the taking lens at a predetermined first speed in the optical axis direction in accordance with the operation of the switch means;
a lens detecting means for detecting the movement of the taking lens in the optical axis direction;
said control means controlling the drive means to drive the taking lens at a second speed, higher than the first speed, in the optical axis direction when the lens detecting means detects continuous movement of the taking lens in the optical axis direction for a predetermined period of time; and
wherein said lens detecting means comprises a rotary member which is rotated by the drive means, a pulse generator which generates pulses corresponding to the angular displacement of the rotary member, and a pulse detecting means which counts the number of pulses generated by the pulse generator and determines if the counted number of consecutive pulses is a predetermined value.

12. In a zoom lens camera comprising:
a taking lens having a zooming function;
a drive means for driving the taking lens in the optical axis direction thereof;
a switch means which is actuated to drive the taking lens in the optical axis direction;
a means for controlling the drive means to drive the taking lens at a predetermined first speed in the optical axis direction in accordance with the operation of the switch means;
a switch detecting means for detecting the operation of the switch means,
said control means controlling the drive means to drive the taking lens at a second speed higher, than the first speed, in the optical axis direction when the switch detecting means detects continuous operation of the switch for a predetermined period of time; and
wherein said switch detecting means comprises a rotary member which is rotated by the drive means, a pulse generator which generates pulses corresponding to the angular displacement of the rotary member, and a pulse detecting means which counts the number of pulses generated by the pulse generator and determines if the counted number of consecutive pulses is a predetermined value.

13. A zoom lens camera comprising:
a zoom taking lens having a zooming function;
a drive means for driving the zoom taking lens;
a telephoto switch which is actuated to effect the drive means to drive the zoom taking lens in a manner that increases the focal length thereof;
a wide angle switch which is actuated to effect the drive means to drive the zoom taking lens in a manner that decreases the focal length thereof;
a zooming speed varying means for varying a zooming speed of the zoom taking lens through the drive means when a predetermined condition is satisfied during a zooming operation when one of the telephoto switch or the wide angle switch is being actuated, the predetermined condition occurring when one of said telephoto or wide angle switches is continuously operated beyond a predetermined period of time; and
means for detecting the time during which no change in the zooming operation occurs to thereby determine the period of time for which one of said telephoto or wide angle switches has been continuously operated, said detecting means comprising a rotary member which is rotated by the drive means, a pulse generator which generates pulses corresponding to the angular displacement of the rotary member, and a pulse detecting means which counts the number of pulses generated by the pulse generator and determines if the counted number of consecutive pulses is a predetermined value.

* * * * *

UNITED STATES PATENT AND TRADEMARK OFFICE
CERTIFICATE OF CORRECTION

PATENT NO. : 5,305,038
DATED : April 19, 1994
INVENTOR(S) : Makoto MOGAMIYA

It is certified that error appears in the above-indentified patent and that said Letters Patent is hereby corrected as shown below:

At column 10, line 9 (claim 12, line 17) of the printed patent, insert ---means--- after "switch".

Signed and Sealed this

Twenty-ninth Day of August, 1995

Attest:

BRUCE LEHMAN

Attesting Officer        *Commissioner of Patents and Trademarks*